United States Patent
Ito et al.

(10) Patent No.: US 6,926,068 B2
(45) Date of Patent: Aug. 9, 2005

(54) AIR PASSAGE SWITCHING DEVICE AND VEHICLE AIR CONDITIONER

(75) Inventors: Koichi Ito, Kariya (JP); Haruki Ikuta, Hekinan (JP); Toshio Torii, Gamagori (JP)

(73) Assignee: DENSO Corporation, Kariya (JP)

( * ) Notice: Subject to any disclaimer, the term of this patent is extended or adjusted under 35 U.S.C. 154(b) by 118 days.

(21) Appl. No.: 09/760,282

(22) Filed: Jan. 12, 2001

(65) Prior Publication Data

US 2001/0008148 A1 Jul. 19, 2001

(30) Foreign Application Priority Data

Jan. 13, 2000 (JP) .......................... 2000-009966
Apr. 6, 2000 (JP) .......................... 2000-105277

(51) Int. Cl.[7] .......................... B60H 1/00; B60H 1/24; B60H 1/26
(52) U.S. Cl. .......................... 165/43; 165/42; 251/901; 454/121; 454/126; 454/156
(58) Field of Search .......................... 251/901; 165/41, 165/42, 43; 454/121, 126, 156

(56) References Cited

U.S. PATENT DOCUMENTS

| | | | |
|---|---|---|---|
| 5,564,979 A | | 10/1996 | Sumiya et al. |
| 5,676,595 A | * | 10/1997 | Sumiya et al. ............... 454/121 |
| 5,899,262 A | | 5/1999 | Yamaguchi et al. |
| 5,906,355 A | * | 5/1999 | Danieau ..................... 251/901 |
| 5,931,733 A | * | 8/1999 | Danieau ..................... 454/156 |
| 6,588,495 B2 | | 7/2003 | Ito et al. |

FOREIGN PATENT DOCUMENTS

| | | | |
|---|---|---|---|
| JP | 5-280802 | * | 10/1993 |
| JP | 10-58947 | * | 3/1998 |
| JP | 11-123922 | * | 5/1999 |
| JP | A-11-254944 | | 9/1999 |
| JP | 11-348539 | * | 12/1999 |
| JP | 2000-43536 | * | 2/2000 |
| JP | 2000-43537 | * | 2/2000 |

* cited by examiner

*Primary Examiner*—John K. Ford
(74) *Attorney, Agent, or Firm*—Harness, Dickey & Pierce, PLC

(57) ABSTRACT

In an air passage switching device using a film-type sliding door for an air-conditioning unit for a vehicle. A grid member is provided in an air passage to extend parallel with the sliding direction of a sliding door and divide an opening of the air passage into a plurality of smaller openings. The sliding door has a film member, a door plate supporting the film member, and elastic pressing means for pressing the film member against edge seal faces of the air passage. A grill spacing between the door plate and the end face of the grid member, is larger than an edge seal face spacing between the door plate and the edge seal faces.

9 Claims, 14 Drawing Sheets

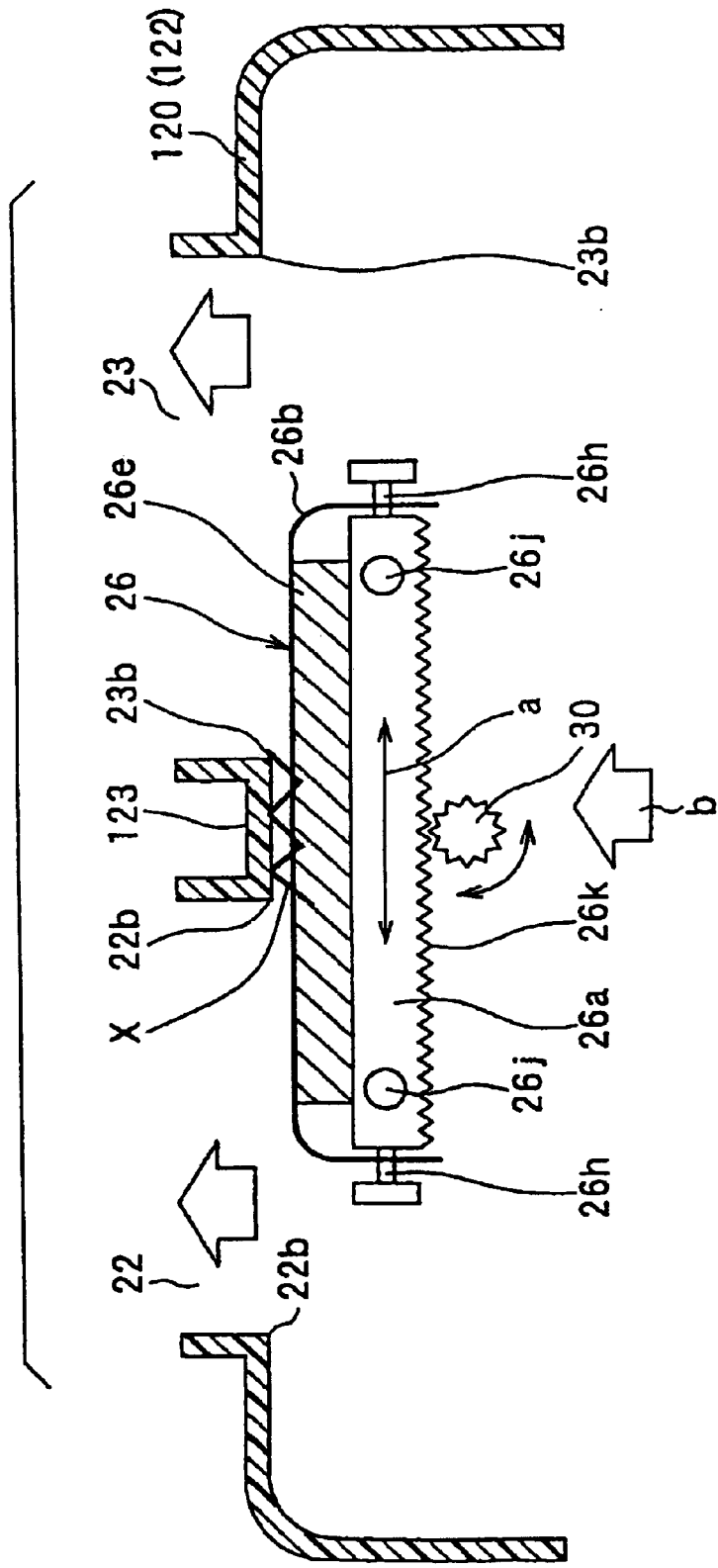

AIR PASSAGE SWITCHING DEVICE AND VEHICLE AIR CONDITIONER

CROSS-REFERENCE TO RELATED APPLICATION

The present invention is related to Japanese patent application No. 2000-9966, filed Jan. 13, 2000; No. 2000-105277, filed Apr. 6, 2000, the contents of which are incorporated herein by reference.

FIELD OF THE INVENTION

The present invention relates to an air passage switching device, and more particularly, to an air passage switching device for switching air passages with a sliding door that slides along opening faces of the air passages.

BACKGROUND OF THE INVENTION

In Japanese Unexamined Patent Publication No. H.8-258538, the present inventors previously proposed a device for switching air passages in a vehicle air conditioner by means of a sliding door of this kind. And on the basis of this related art, the present inventors produced for trials and studied an air passage switching device shown in FIGS. 10A–11, 13. FIGS. 10A and 10B are sectional views on the line 10—10 in FIG. 3, FIG. 11 is a sectional view on the line 11—11 in FIG. 10A, and FIG. 13 is a sectional view on the line 13—13 in FIG. 3.

In the present trial device, a sliding door 26 has a substantially flat, rectangular door plate 26a and a resin film member 26b supported by this door plate 26a. A flow of air passes through openings 26c provided in the door plate 26a (see FIG. 5) and blows in the arrow b direction onto the film member 26b. A draft pressure of this airflow acts on the film member 26b.

This draft pressure causes the film member 26b to press against edge seal faces 22b, 23b (FIGS. 10B, 13) of a port 22 or 23 of a case 120, the port 22 or 23 can be closed. And, by the sliding door 26 being slid in the arrow a direction and the film member 26b thereby being moved away from the port 22 or 23 in the case, the port 22 or 23 can be opened. By this means, it is possible to effect air passage switching.

When, as mentioned above, a film-type sliding door 26 was actually produced for trials and studied, it was found that if the opening area of the ports 22, 23 in the case is large, when the port 22 or the port 23 is closed, the film member 26b greatly bends and enters the closed port 22 or 23 under the draft pressure in the passage behind it. When this happens, a gap forms between the edge seal faces 22b, 23b of the ports 22, 23 and the film member 26b. Accordingly, problems arise such as draft leakage and the bent portion of the film member 26b biting into the edge corners of the ports 22, 23 when the sliding door 26 are moved. Accordingly, the force required to operate the sliding door 26 consequently increasing.

As a study into overcoming this, grill members 22a, 23a were formed midway across the ports 22 and 23 on the case 120 side, extending in the sliding direction a of the sliding door 26 and dividing the opening faces into two, to suppress bending of the film member 26b. However, when all that is done is simply to form the grill members 22a and 23a, problems arise such as that the film member 26b impacts the grill members 22a, 23a and produces a striking noise.

Accordingly, the present inventors conceived a solution wherein elastic pressing members 26e are disposed between the door plate 26a and the film member 26b and at all times the film member 26b is pressed by elastic reactions of these elastic pressing members 26e against the edge seal faces 22b, 23b of the ports 22, 23 and the end faces of the grill members 22a, 23a.

By this means it is possible to prevent, with the grill members 22a, 23a, the phenomenon of the film member 26b bending greatly and entering the ports 22, 23. It is also possible to prevent with the elastic pressing members 26e problems such as striking noises caused by impacting of the film member 26b onto the grill members 22a, 23a.

However, when the operating characteristics of this device produced for trials were evaluated under actual usage conditions, it became clear anew that disagreeable extraneous noise is produced from the film member 26b. And when the mechanism by which this extraneous noise is produced was investigated in detail by experiment it was found to be as follows.

The case 120 forming the ports 22, 23 is molded from resin, and for reasons relating to the molding process it is molded in two portions. D in FIG. 3 denotes the plane on which the case 120 is divided, and in the example shown in FIG. 3 this dividing plane D is set along the grill members 22a, 23a in a position in front of the grill members 22a, 23a. Thus, the case 120 is made by joining together with fastening means (not shown) left and right half-cases 121, 122 shown in FIG. 3.

Because they share this kind of dividing plane D, the cross-sectional shape (the cross-sectional shape in a W-direction section, orthogonal to the door sliding direction a) of each of the half-cases 121, 122 is U-shaped. And consequently, the portions of the half-cases 121, 122 proximate the dividing plane D fall in toward the inside of the case due to 'sinking' of the material after the resin molding.

FIG. 10A shows the assembled state of the sliding door 26 when these portions proximate the dividing plane D have fallen in toward the inside of the case. When this kind of assembled state arises, at the portions in the vicinity of the dividing plane D in the middle of the ports, due to the phenomenon of falling in mentioned above, the spacing L1 between the end faces of the grill members 22a, 23a and the upper face of the door plate 26a become smaller than the spacing L2 at the W-direction ends of the ports 22, 23 (L1<L2).

Consequently, at the portions in the vicinity of the dividing plane D in the middle of the ports, the film member 26b is pressed more strongly than elsewhere. As a result of this, as the sliding door 26 is repeatedly moved back and forth and a concave permanent distortion develops in the film member 26b.

At the intermediate portions of the film member 26b between the grill members 22a, 23a and the W-direction ends of the ports 22, 23 (the section 11—11 in FIG. 10A), because the pressing force of the elastic pressing members 26e does not act directly on the film member 26b at this position, when the film member 26b passes over the edge seal faces 22b, 23b of the ports 22 and 23, the above-mentioned concave permanently distorted part springs up and warps and makes noise (a popping noise).

FIG. 11 (a sectional view on 11—11 in FIG. 10A) shows the film member 26b passing over the edge seal faces 22b, 23b of a central grid member 123 of the case 120. The above-mentioned popping noise arises both when the film member 26b passes over the edge seal faces 22b, 23b of the central grid member 123 and when it passes over the edge seal faces 22b, 23b at the door sliding direction a ends.

To overcome this, the present inventors produced a device wherein elastic pressing members 26e were added at intermediate positions on the film member 26b, between the grill members 22a, 23a and the W-direction ends of the ports 22 and 23, to increase the pressing force on the film member 26b. With this it was found that by increasing the pressing force it is possible to prevent the above-mentioned warp deformation of the concave permanent distortion and thereby prevent the production of popping noise.

However, instead, an extraneous noise (a crackling noise) caused by an increase in the frictional force on the film member 26b arises. That is, when a predetermined dust-resistance endurance test in an environment wherein dust is mixed with the delivered air (the endurance test conditions being 20,000 back-and-forth movements of the door under the F3 conditions of JIS D0207) is carried out, the surface of the film member 26b roughens, the surface roughness of the film increases from an initial 0.29 µm RZ to 0.61 µm RZ after the test, and this increase in surface roughness combines with the increase in pressing force to raise the frictional force on the film member 26b.

As a result, the surface of the film member 26b undergoes a so-called slip-stick phenomenon, a sawtooth-form fluctuation in friction caused by microscopic slipping and sticking between the film member 26b and the edge seal faces 22b, 23b on the case side (see part X in FIG. 13), and the film member 26b produces a crackling noise.

SUMMARY OF THE INVENTION

It is therefore an object of the present invention to prevent the production of extraneous noise (popping noise and crackling noise) by a film member in an air passage switching device using a film-type sliding door.

To achieve this and other objects, the present invention provides an air passage switching device for opening and closing air passages by means of a sliding door which slides along opening faces of the air passages, wherein grill members dividing the opening faces of the air passages are formed in the air passages, parallel with a sliding direction of the sliding door. The sliding door comprises a film member, a door plate supporting the film member, and elastic pressing means for elastically pressing the film member against edge seal faces of the air passages and end faces of the grill members. The spacing between the door plate and the end faces of the grill members in the centers of the air passages in a direction (W) orthogonal to the sliding direction (a) of the sliding door is greater than the spacing between the door plate and the edge seal faces at the ends of the air passages in the same direction (W).

In a second provision, the spacings L1 and L2 are set in the relationship L1>L2 and a maximum value of the spacing L1 is set in a range such that the amount of elastic compression of the elastic pressing means on assembly of the device is at least 0.

In a third provision, the elastic pressing means comprises a plurality of slender elastic pressing means extending parallel with the sliding direction of the sliding door and disposed only in positions where they face the edge seal faces of the air passages and the end faces of the grill members.

In a fourth provision, the invention provides an air passage switching device for opening and closing air passages by means of a sliding door which slides along opening faces of the air passages. Grill members divide up the opening faces of the air passages are formed in the air passages, parallel with the sliding direction of the sliding door; the sliding door comprises a film member, a door plate supporting the film member, and elastic pressing means for pressing the film member with an elastic reaction against edge seal faces of the air passages and end faces of the grill members. The elastic pressing means comprises a plurality of slender elastic pressing means extending parallel with the sliding direction of the sliding door and are disposed only in positions where they face the edge seal faces of the air passages and the end faces of the grill members.

In a fifth provision, the invention provides an air passage switching device for opening and closing air passages by means of a sliding door which slides along opening faces of the air passages, wherein the sliding door comprises a film member, for pressing against edge seal faces of the air passages and closing the air passages, and a door plate supporting the film member; the door plate is provided with openings for allowing a draft pressure to act on the film member; and elastic pressing means for pressing the film member against the edge seal faces of the air passages with an elastic reaction disposed between the film member and the door plate and are fixed to the film member.

Further areas of applicability of the present invention will become apparent from the detailed description provided hereinafter. It should be understood that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein:

FIG. 13 is a sectional view on 13—13 in FIG. 3 illustrating a mechanism by which a sliding door produces a crackling noise.

DETAILED DESCRIPTION OF THE PREFERRED EMBODIMENTS

FIGS. 1 through 7 show a first preferred embodiment of the invention. A vehicle air-conditioner of this preferred embodiment is a rear seat air-conditioner for air-conditioning a rear seat side space in a vehicle having a large passenger compartment, such as a one box car.

Figure 1:
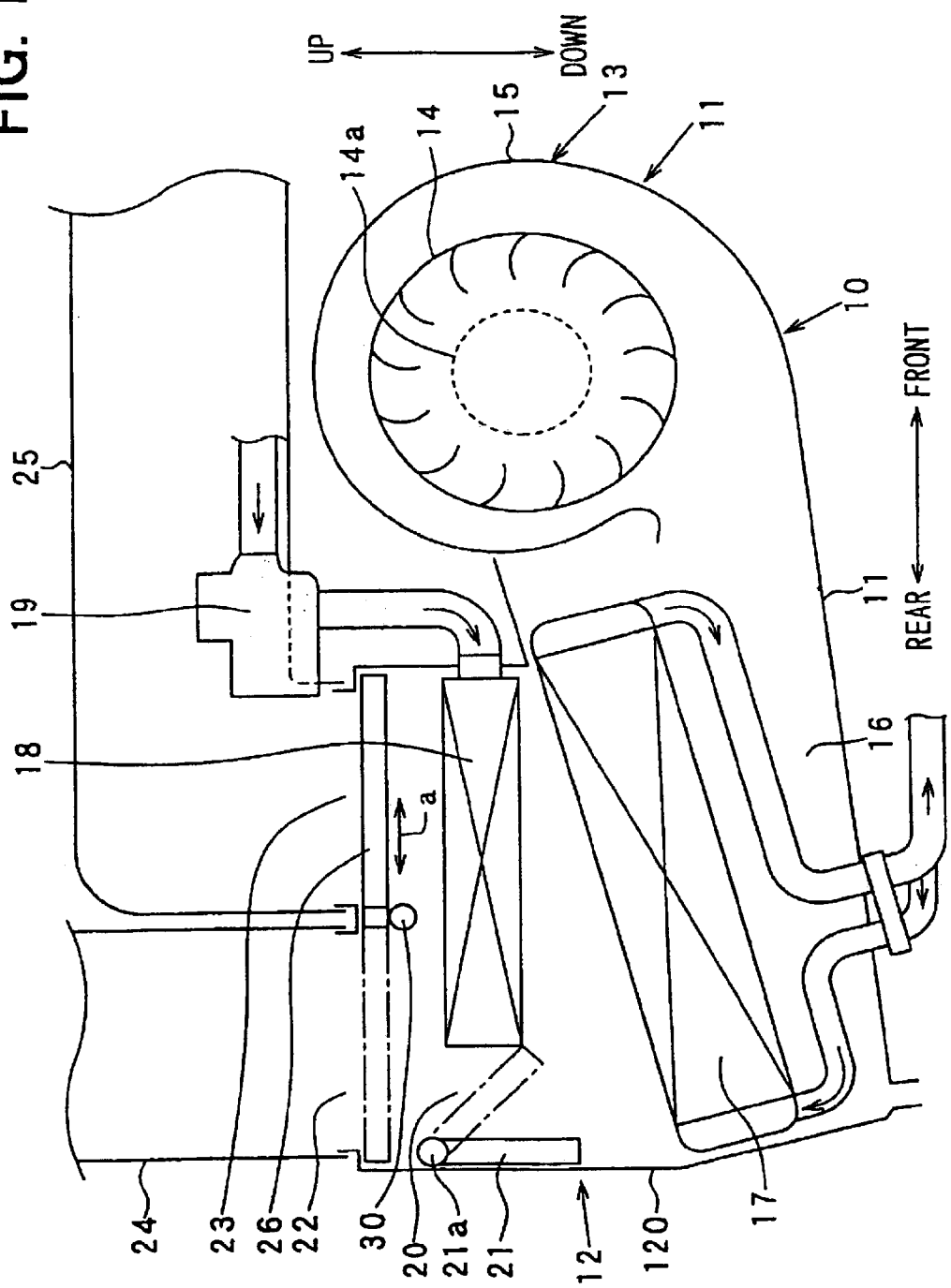
FIG. 1 is a schematic sectional view of a rear seat air conditioner for a vehicle according to a first preferred embodiment of the present invention.

Referring to FIG. 1, the reference numeral 10 denotes a rear seat air-conditioner, and the main body of this air-conditioner 10 is mounted near the floor of a rear of a vehicle between a vehicle outer wall and a vehicle inner wall. The vehicle air-conditioner 10 consists mainly of a blower unit 11 and an air-conditioning unit 12 aligned in the front-rear direction of the vehicle.

The blower unit 11 draws inside air from the rear part of the passenger compartment for the air-conditioner 10, and in this preferred embodiment the vehicle air-conditioning unit 12 only takes in inside air. The blower unit 11 has an inside air intake opening (not shown) formed on each side (widthwise direction of the vehicle, perpendicular to the paper in FIG. 1).

The blower unit 11 has a centrifugal electric blower 13. This blower 13 has a centrifugal fan 14 and a fan motor 14a, and the centrifugal fan 14 is rotatably mounted inside a scroll housing 15.

A duct 16 constituting a flow passage extending in the front-rear direction of the vehicle is formed on the downstream side of the scroll housing 15. This duct 16 is for changing the flow delivered by the blower unit 11 from downward to upward and guiding it into an evaporator 17. An outlet part of the blower unit 11 is connected to an inlet of the air-conditioning unit 12 by duct 16.

The air-conditioning unit 12 is disposed behind the blower unit 11 in the front-rear direction of the vehicle and has a resin case 120 forming an air passage extending upward. Inside the case 120 of the air-conditioning unit 12 is the evaporator 17, which is a heat exchanger for cooling air-conditioning air. Also disposed here is a heater core 18, a heat exchanger for heating air-conditioning air, that is positioned on the downstream side of the evaporator 17 in the air flow. The evaporator 17 and the heater core 18 are mounted inside the air-conditioning unit 12, one above the other, so that their main faces are roughly horizontal.

Thus, air delivered by the blower 13 flows toward the rear of the vehicle through the duct 16 and then is guided into the case 120 of the air-conditioning unit 12. And the delivered air guided into the case 120 changes in flow direction from downward to upward and passes through the evaporator 17 and the heater core 18.

The evaporator 17 forms part of an ordinary refrigerating cycle circuit together with a compressor, a condenser, a receiver and a pressure-reducer (not shown), and cools and dehumidifies air inside the case 120 by drawing latent heat of evaporation of refrigerant from the air. The heater core 18 heats a cool draft cooled in the evaporator 17 with warm water from a vehicle engine (cooling water) as a heat source.

In this preferred embodiment, a warm water valve 19 for adjusting a flow of warm water to the heater core 18 is provided in a warm water circuit serving the heater core 18, and the outlet temperature of air entering the passenger compartment is controlled by the flow of warm water to the heater core 18 being adjusted by aperture adjustment of this warm water valve 19.

A cool draft bypass passage 20 through which air (a cool draft) having passed through the evaporator 17 can bypass the heater core 18 is also provided in the case 120 of the air-conditioning unit 12. This cool draft bypass passage 20 is opened and closed by a cool draft bypass door 21.

In the case 120 of the air-conditioning unit 12, a face port 22 and a foot port 23 are formed on the downstream side of (i.e. above) the heater core 18. The face port 22 is for delivering an air-conditioning draft temperature-adjusted by the heater core 18 toward the upper bodies of rear seat occupants, and is connected by a face duct 24 to rear seat face outlets (not shown) in the ceiling of the vehicle.

The foot port 23 delivers an air-conditioning draft temperature-adjusted by the heater core 18 toward the feet of rear seat occupants, and is connected by a foot duct 25 to rear seat foot outlets (not shown) positioned at the feet of rear seat occupants.

The face port 22 and the foot port 23 constitute air passages of the present invention and are opened and closed by a sliding door 26, whereby it is possible to switch between three ordinary air-conditioning outlet modes: a FACE mode, a BI-LEVEL mode and a FOOT mode.

A specific example of this sliding door 26 will now be described, with reference to FIGS. 2 through 5. The sliding door 26 slides in the arrow a direction (i.e. the vehicle front-rear direction) shown in FIG. 2 along the air passage opening faces of face port 22 and the foot port 23. W in FIG. 3 denotes the width (left-right) direction of the vehicle.

Figure 4:
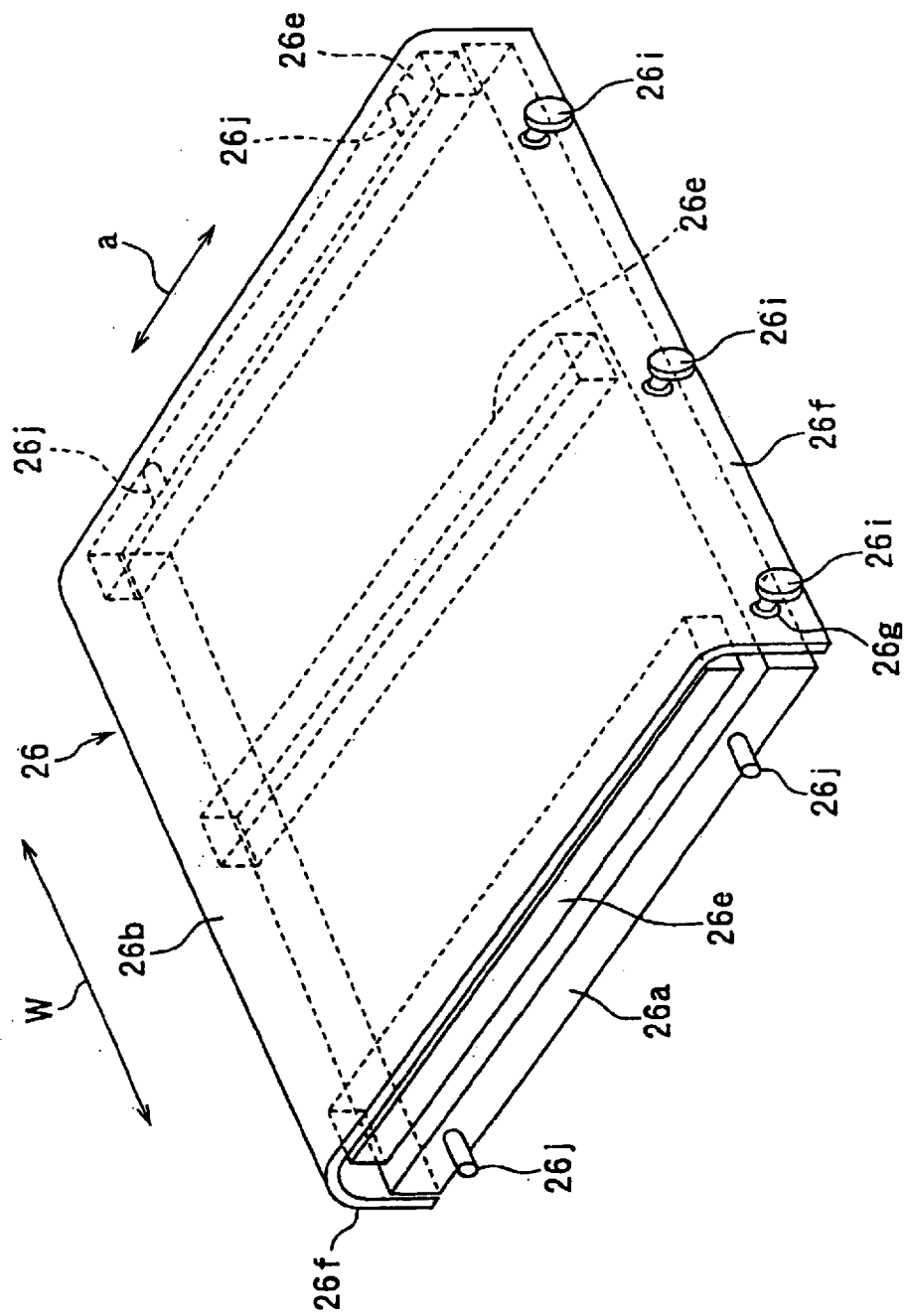
FIG. 4 is an enlarged perspective view of a sliding door according to the present invention.
Figure 5:
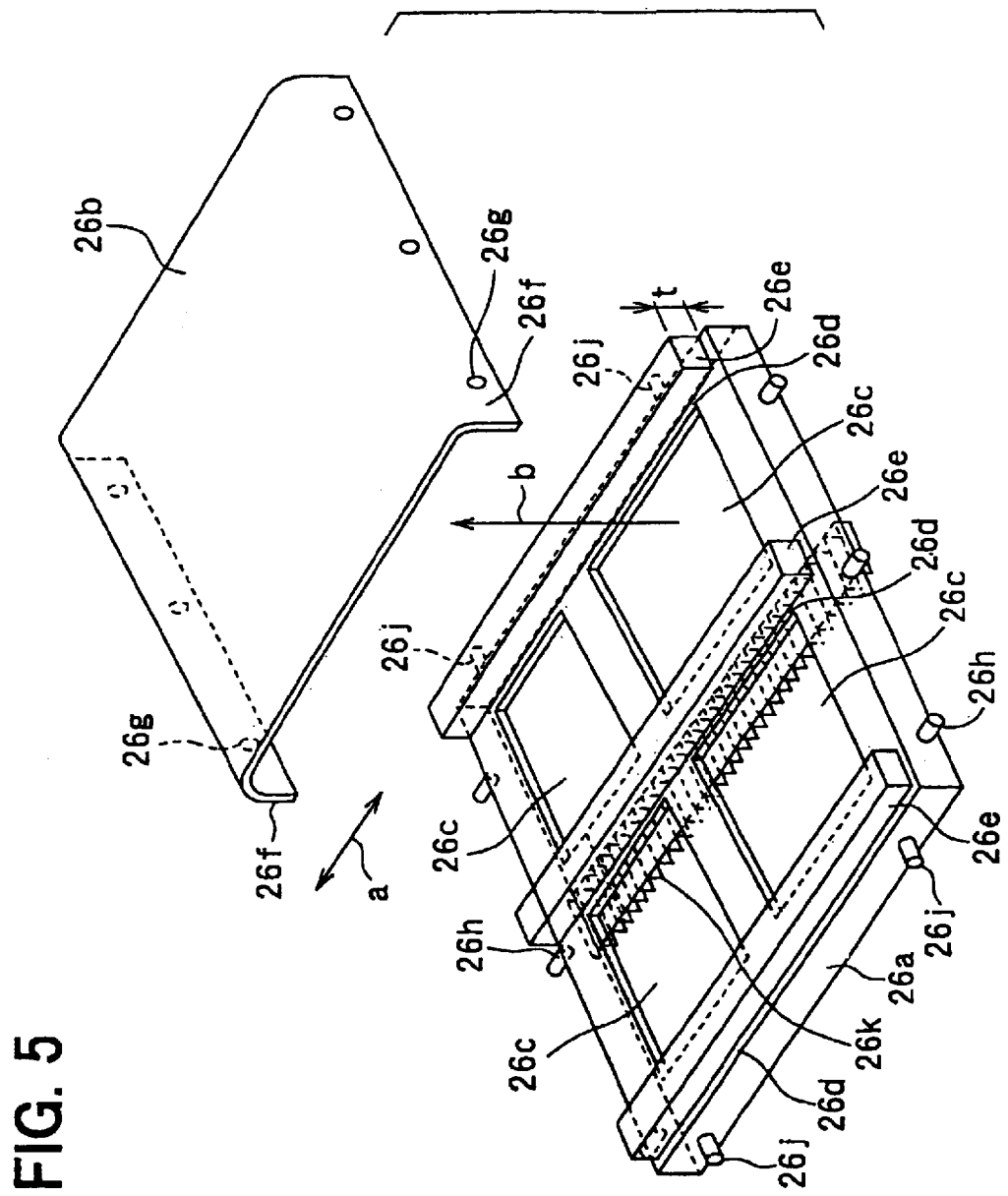
FIG. 5 is an exploded perspective view of a sliding door according to the present invention.

As shown in FIG. 4 and FIG. 5, the sliding door 26 has a door plate 26a and a film member 26b supported by this door plate 26a. The door plate 26a is formed from resin such as polypropylene and shaped as a flat frame with four openings 26c (see FIG. 5). The film member 26b is attached to the upper face (the face on the side of the ports 22, 23) of this door plate 26a to cover the four openings 26c in the door plate 26a. The film member 26b has an area larger than either ports 22, 23 to close either of ports 22, 23.

This film member 26b is molded from a resin material as a thin film having a certain degree of flexibility, low frictional resistance, and no permeability to air. Specifically, the film member 26b consists, for example, of a film of PET (PolyEthylene Terephthalate) of thickness 188 μm. The four openings 26c in the door plate 26a allow a draft pressure inside the case 120 to act on the film member 26b.

The specific structure by which the film member 26b is attached will now be described. The film member 26b is molded in a shape having a bent portion 26f at each of each end in the door sliding direction a, as shown in FIG. 5, and a plurality of slot-shaped fixing holes 26g are provided in each of these bent portions 26f. The same number of fixing pins 26h as there are respective fixing holes 26g are integrally formed projecting from each end of the door plate 26a, and the film member 26b is attached to the door plate 26a by the fixing holes 26g in the bent portions 26f of the film member 26b being fitted over these fixing pins 26h and the tips of the fixing pins 26h then being thermally finished. In FIG. 4, the reference numeral 26i denotes an enlarged part formed at the tip of each of the fixing pins 26h by the thermal finishing.

Guide pins 26j are integrally molded projecting from two locations on each side face of the door plate 26a (its left and right end faces in the direction W orthogonal to the door sliding direction a). These guide pins 26j guide the sliding of the sliding door 26 in the arrow a direction. That is, in the case 120, on the inner walls thereof below the face port 22 and the foot port 23, left and right side horizontal guide channels 27, 28 (FIGS. 2 and 3) extending parallel with the door sliding direction a are provided. The guide pins 26j are fitted slidably in these guide channels 27, 28. As a result, the sliding door 26 is held slidably in the case 120 by the mating between the guide pins 26j and the guide channels 27, 28.

Also, on the lower face of the door plate 26a (the face on the heater core 18 side), a rack 26k extending parallel with the door sliding direction a is formed integrally with the door plate 26a. More specifically, as shown in FIG. 5, this rack 26k is formed on the lower side of a central plate face 26d portion of the door plate 26a.

Figure 2:
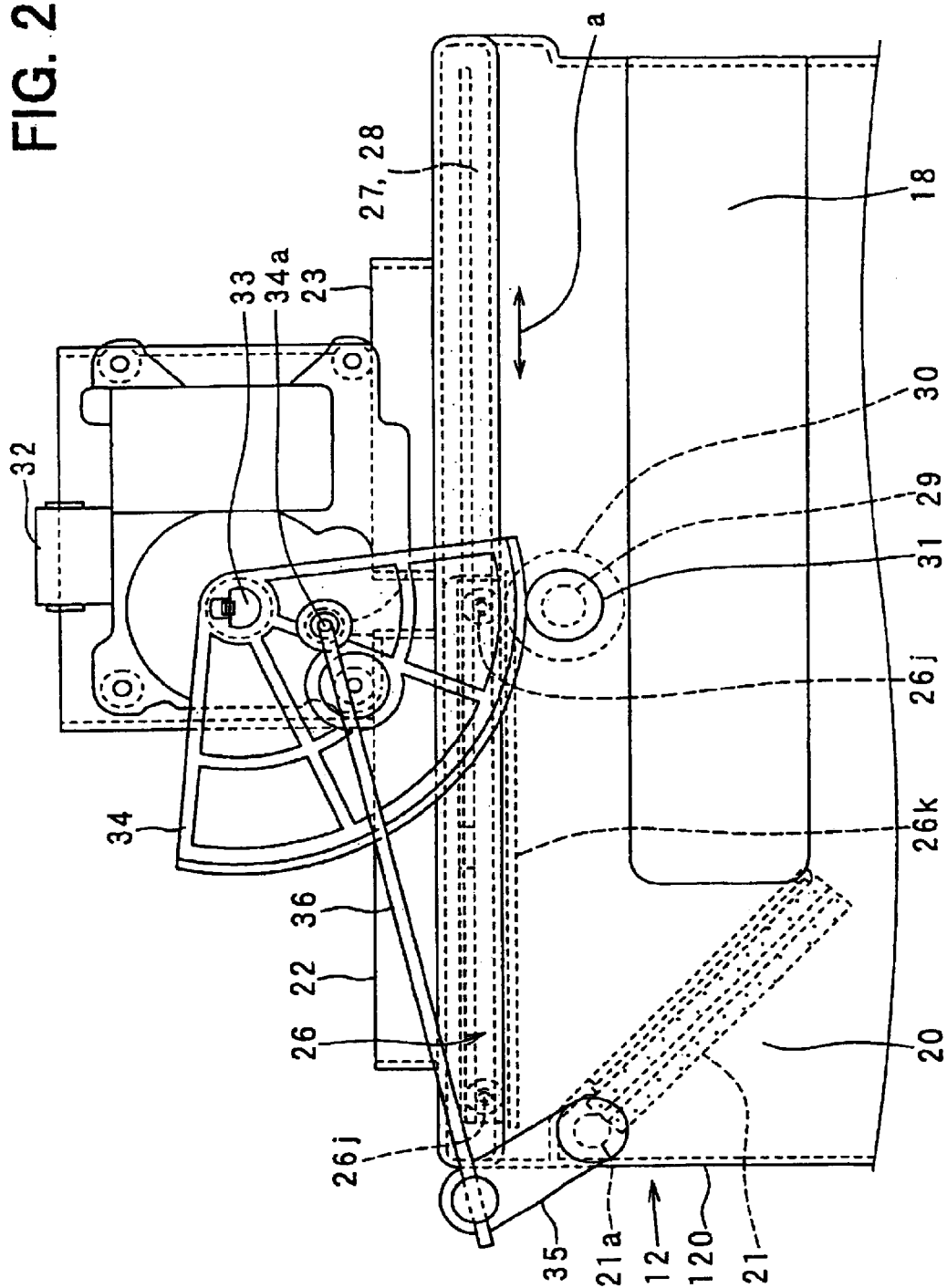
FIG. 2 is a plan view of a door according to the present invention.

And as shown in FIG. 2, inside the case 120, directly below the sliding door 26 and between the face port 22 and the foot port 23, a rotary shaft 29 is mounted in a direction orthogonal to the door sliding direction a. This rotary shaft 29 is made of resin, and is rotatably supported by bearing holes (not shown) in the walls of the case 120. A pinion 30 is provided on this rotary shaft 29 by integral molding with resin at a central location facing the rack 26k. This pinion 30 is positioned inside the case 120 and meshes with the rack 26k.

One end of the rotary shaft 29 projects to outside the case 120, and a driving gear 31 is provided on this projecting part. This driving gear 31 is also molded from resin integrally with the rotary shaft 29. A servo motor 32 constituting a door driving device is mounted on the upper side of the case 120, as shown in FIG. 2, and a sector gear 34 is attached to the output shaft 33 of the servo motor 32. This sector gear 34 meshes with the driving gear 31. By this means, rotation of the servo motor 32 is transmitted via the sector gear 34 and the driving gear 31 to the rotary shaft 29. And, rotation of the rotary shaft 29 is converted to straight-line motion of the sliding door 26 by the meshing between the pinion 30 and the rack 26k.

In this preferred embodiment, a rotary shaft 21a of the cool draft bypass door 21 for opening and closing the cool draft bypass passage 20 is linked by links 35, 36 to a pin 34a of the sector gear 34, and the cool draft bypass door 21 is thereby pivoted in cooperation with rotation of the sector gear 34.

Figure 3:
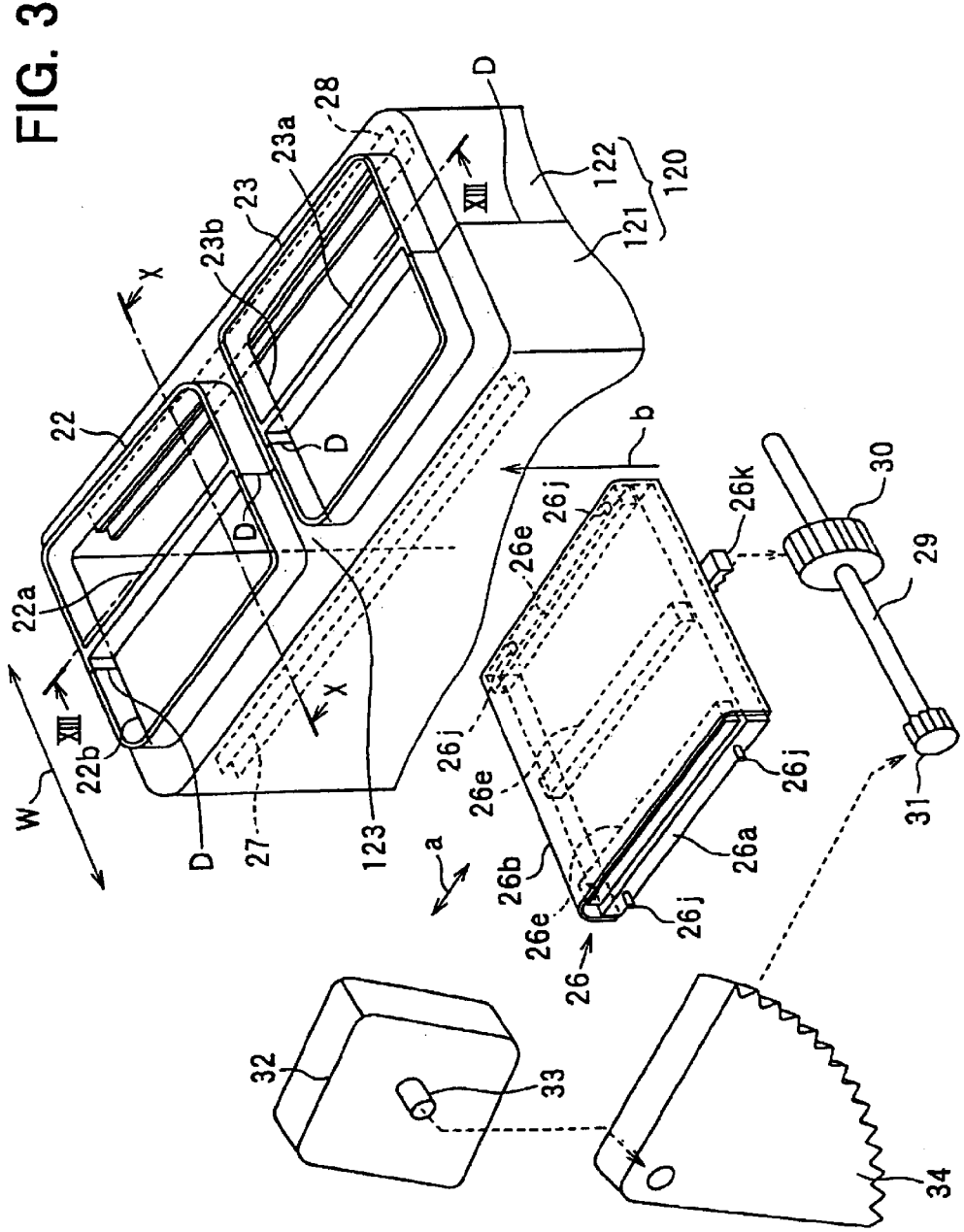
FIG. 3 is an exploded perspective view of a sliding door driving mechanism according to the present invention.

The face port 22 and the foot port 23 of the case 120 of the air-conditioning unit 12 are both substantially rectangular in shape, as shown in FIG. 3, and have respective grill members 22a, 23a formed in their centers. These grill members 22a, 23a extend parallel with the sliding (movement) direction a of the sliding door 26, and divide the opening faces of the ports 22, 23 into two.

The four-pane window frame shape of the door plate 26a has plate faces 26d (FIG. 5) extending parallel with the door sliding direction a and facing edge seal faces 22b, 23b of the ports 22, 23 and end faces of the grill members 22a and 23a, and elastic pressing members 26e are fixed by means such as adhesion to these plate faces 26d. These elastic pressing members 26e are cross-sectionally rectangular and are slender in shape, having a width dimension slightly narrower than the width of each of the plate faces 26d.

The thickness t (FIG. 5) of the elastic pressing members 26e in the free state is set larger by a predetermined amount than the spacings L1, L2 (FIG. 10c) between the door plate 26a, with the sliding door 26 assembled to the inside of the case 120, and the grill members 22a, 23a and edge seal faces 22b, 23b of the case 120 side. Consequently, when the sliding door 26 is assembled to the inside of the case 120, the elastic pressing members 26e are compressed elastically by a predetermined amount in their thickness t direction.

As a result, by an elastic reaction of the elastic pressing members 26e, the film member 26b is pressed at all times with a predetermined force against the edge seal faces 22b, 23b of the ports 22, 23 and the end faces of the grill members 22a, 23a.

When the air-conditioner is operating, under a draft pressure acting through the openings 26c of the door plate 26a, the film member 26b can press against the edge seal faces 22b or 23b of the port 22 or 23 and the end face of the grill member 22a or 23a and assuredly close the port 22 or 23.

Because the film member 26b performs a sealing function, the elastic pressing members 26e need only make contact with the film member 26b, and does not slide directly on any face of the case 120. Consequently, their durability does not need to be particularly high. Therefore, as long as it is elastic, a cheap material can be used for the elastic pressing members 26e. Specifically, a spongelike porous resin foam material can be used for the elastic pressing members 26e.

The case 120 forming the ports 22, 23 is made up of left and right half-cases 121, 122 divided by a dividing plane D (FIG. 3) set alongside the grill members 22a, 23a in a position in front of the grill members 22a and 23a, as discussed above.

And because the cross-sectional shape (the cross-sectional shape in the W-direction of FIG. 3) of each of the half-cases 121, 122 is a U-shape, a phenomenon of portions of the half-cases 121, 122 around the dividing plane D falling in toward the inside of the case due to 'sinking' of the material after resin molding arises. To avoid this, in this preferred embodiment, in the molding of the half-cases 121 and 122, the molding dies are designed so that the U-shaped cross-sections of the half-cases 121, 122 spread slightly outward of 90°. This ensures that, even if 'sinking' of the material after resin molding arises, the spacings L1 and L2 shown in FIG. 10C maintain the relationship L1>L2.

Figure 10A:
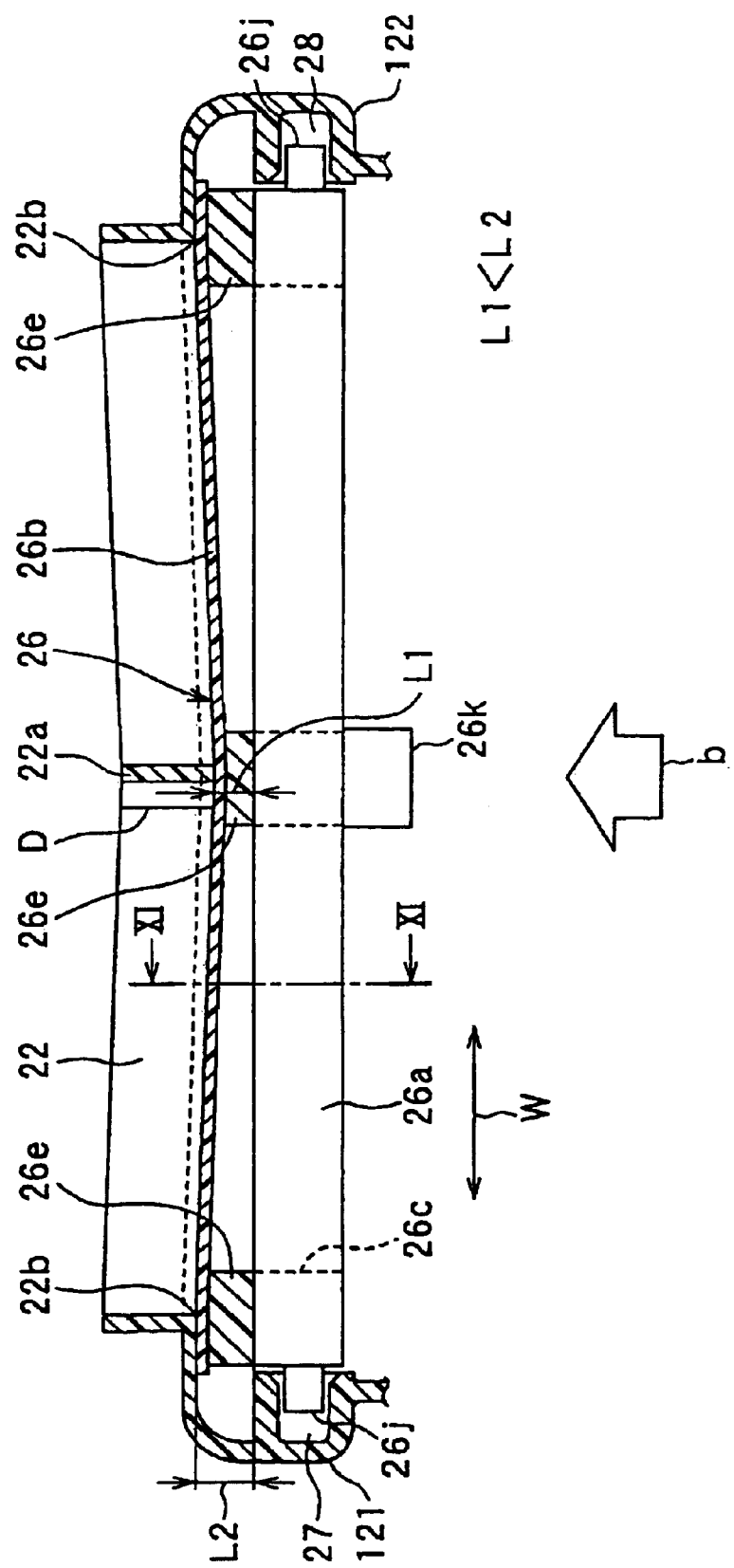
FIG. 10A is a detail sectional view on 10—10 in FIG. 3 of an air passage switching device produced for trials and studied by the present inventors.
Figure 10B:
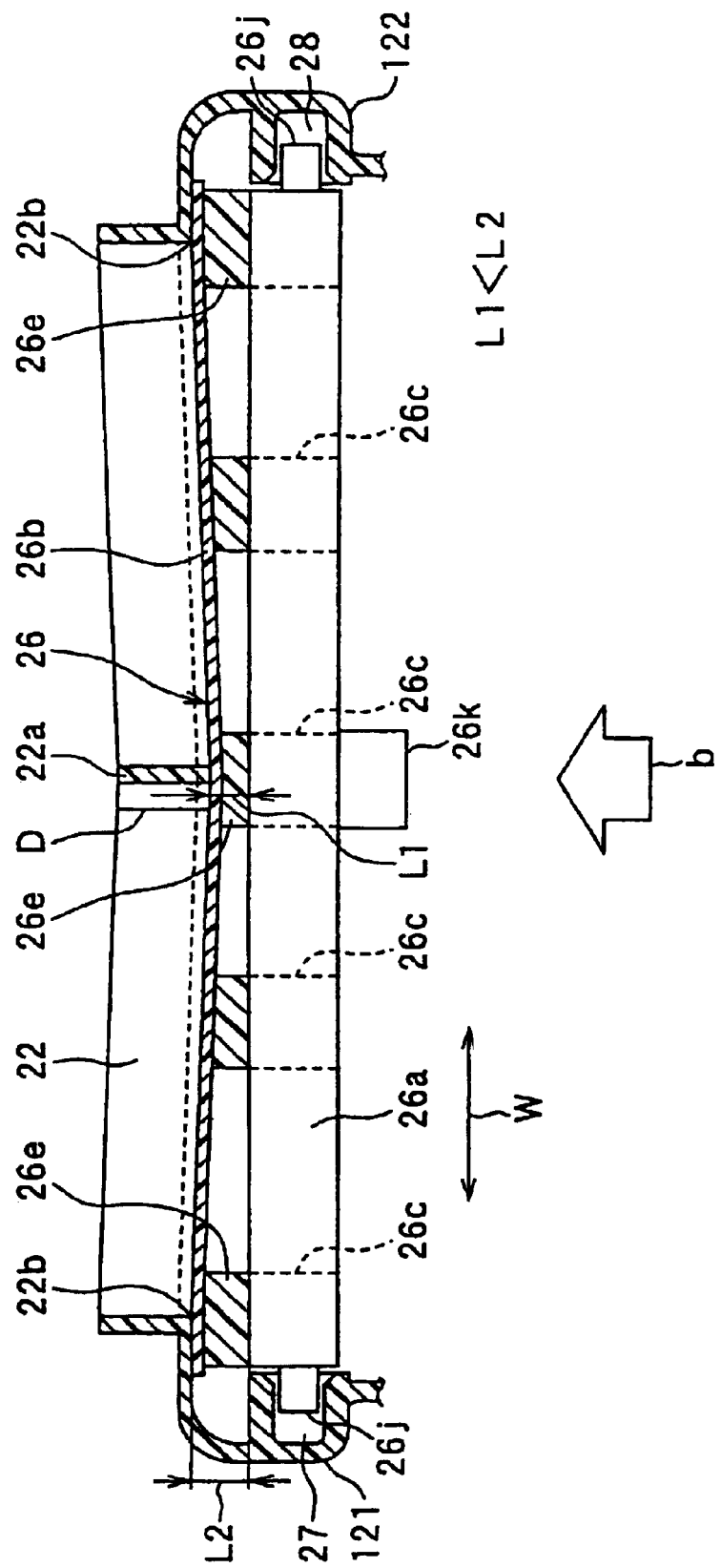
FIG. 10B is a detail sectional view on 10—10 in FIG. 3 of another air passage switching device produced for trials and studied by the present inventors.
Figure 10C:
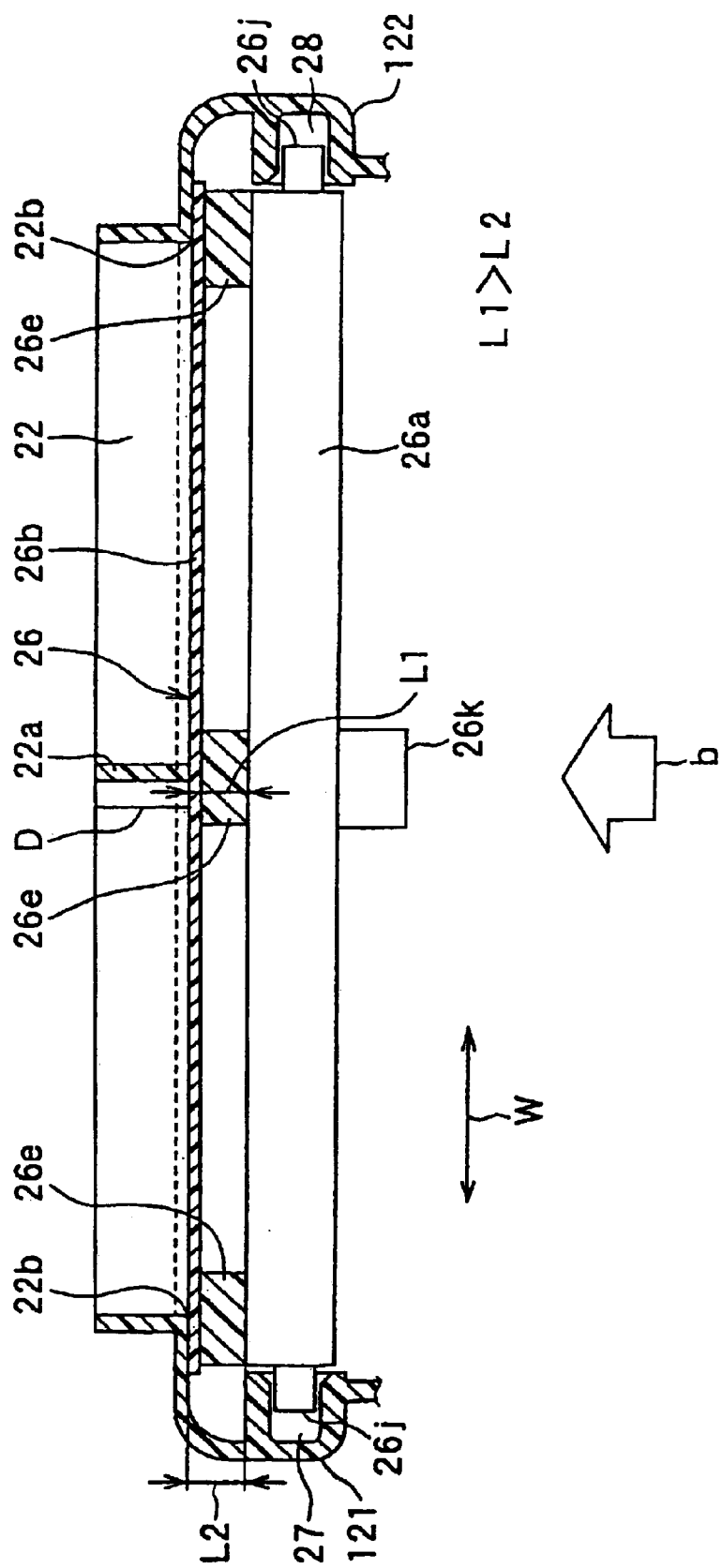
FIG. 10C is a sectional view on 10—10 in FIG. 3.
Figure 11:
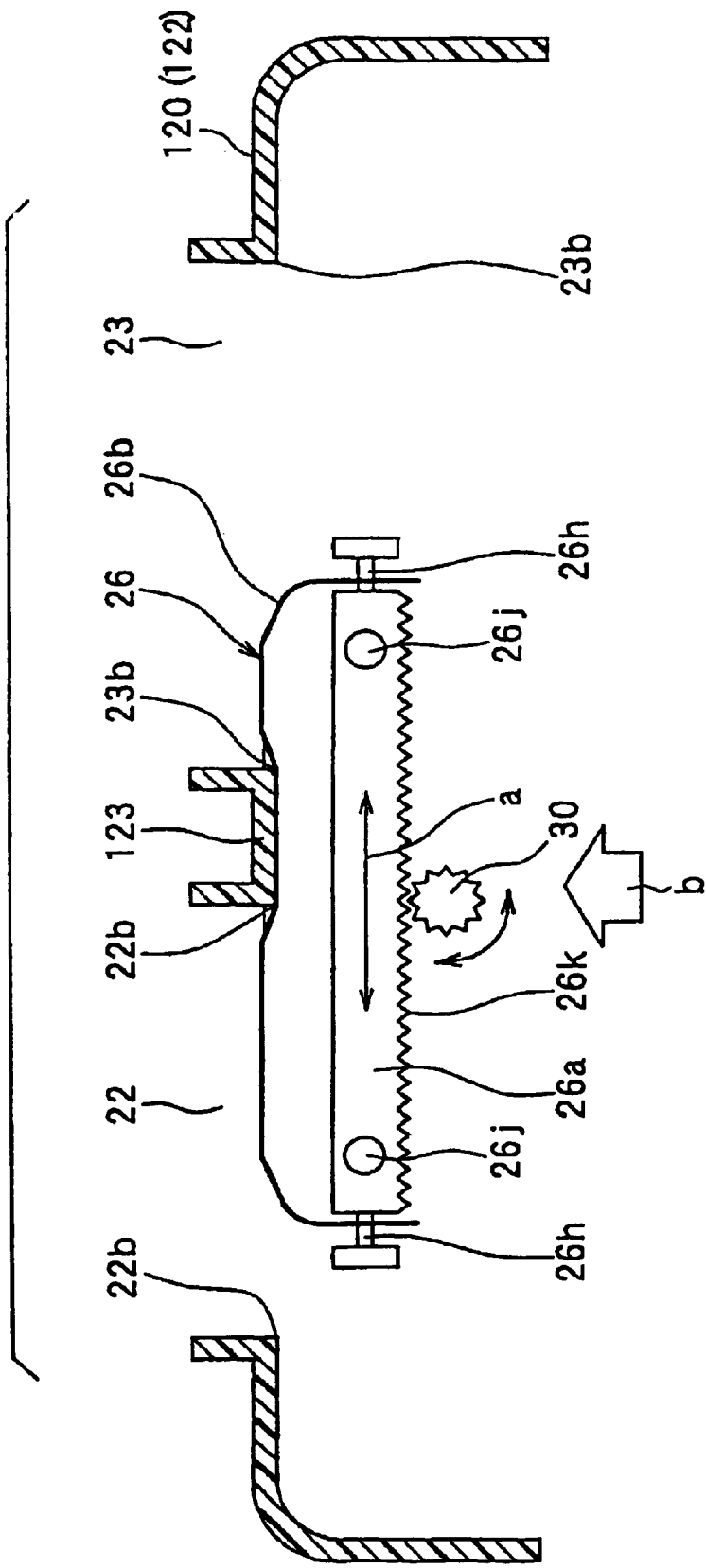
FIG. 11 is a sectional view on 11—11 in FIG. 10A.

That is, FIG. 10C is a sectional view on 10—10 in FIG. 3, and in the direction W orthogonal to the door sliding direction a the spacing L1 is the spacing between the end faces of the grill members 22a, 23a positioned in the centers of the ports 22, 23 and the upper face of the door plate 26a and the spacing L2 is the spacing between the edge seal faces 22b, 23b at the W-direction ends of the ports 22, 23 and the upper face of the door plate 26a. In this preferred embodiment, the U-shaped cross-sections of the half-cases 121, 122 are molded so that L1>L2.

As a specific design example, the thickness t of the three elastic pressing members 26e in the free state is made t=5 mm, and L1 and L2 are set in a predetermined range of up to 4 mm so that the post-assembly elastic compression (amount of compression) of the elastic pressing member 26e positioned at the spacing L1, central in the W-direction, becomes 0.6 mm to 1.0 mm. The post-assembly elastic compression (amount of compression) of the elastic pressing members 26e positioned at the edge seal faces 22b, 23b at the W-direction ends becomes 1.1 mm to 1.5 mm.

The operation of the air-conditioner will now be described. By selecting a rotation direction and rotation amount of the output shaft 33, the position of the sliding door 26 can be freely set in the arrow a direction. By this means, the face port 22 and the foot port 23 can be opened and closed, thereby selecting the FACE mode, FOOT mode or BI-LEVEL mode as desired. When, for example, the FACE mode is set, the cool draft bypass door 21 cooperatively opens the cool draft bypass passage 20. In the BI-LEVEL mode, the cool draft bypass door 21 may be opened by a predetermined amount to make the face outlet temperature lower than the foot outlet temperature.

This preferred embodiment has the following merits in the air passage switching action of the sliding door 26.

[1] Grill members 22a, 23a extending parallel with the sliding direction a of the sliding door 26 and dividing the opening faces of the ports 22, 23 are provided in the ports 22 and 23, and these grill members 22a, 23a limit bulging deformation of the middle of the film member 26b.

[2] Because the film member 26b is pressed against the edge seal faces 22b, 23b of the ports 22, 23 and the end faces of the grill members 22a, 23a at all times by elastic reactions of elastic pressing members 26e, the film member 26b does not impact the edge seal faces 22b, 23b and the grill members 22a, 23a at the start of air delivery.

[3] Also, because the spacing L1 between the upper face of the door plate 26a and the end faces of the grill members 22a, 23a (positioned in the centers of the ports 22, 23 in the direction W orthogonal to the door sliding direction A) is made larger than the spacing L2 between the upper face of the door plate 26a and the edge seal faces 22b, 23b at the ends of the ports 22, 23 in the W-direction (L1>L2), the film member 26b is not excessively pressed proximate grill members 22a, 23a (proximate dividing plane D). Consequently, concave permanent distortion is prevented in the film member 26b, and popping noise caused by warp deformation of a concave permanently distorted part is prevented.

In studies carried out by the present inventors it has been confirmed that even if the spacing L1 central in the W-direction and the spacing L2 at the ends in the W-direction have the relationship L1=L2 excessive pressing deformation of the film member 26b can be avoided and popping noise is prevented. Therefore, the spacings L1, L2 are set to the relationship $L1 \geq L2$.

[4] Because of the above, popping noise by means of the spacing setting $L1 \geq L2$ is prevented. Thus, it is not necessary to increase the number of elastic pressing members 26e from three to five to prevent popping noise as discussed above with reference to FIG. 10B, which increases the pressing force on the film member 26b. As a result, the frictional force between the film member 26b and the case inner walls is reduced. Consequently, slipping and sticking of the film member 26b caused by frictional resistance increasing and a crackling noise from the film member 26b is prevented.

More specifically, when three elastic pressing members 26e are disposed to correspond only with the grill members 22a, 23a in the middle of the ports and the edge seal faces 22b, 23b at the W-direction ends of the ports, by suitable setting of the above-mentioned elastic compression (amount of compression) the average value of the surface pressure between the film member 26b and the case inner wall faces can be kept to about 1.5 g/cm$^2$, whereby crackling noise can be prevented.

When, on the other hand, the number of elastic pressing members 26e is increased from three to five as discussed above with reference to FIG. 10B, the average value of the surface pressure between the film member 26b and the case inner wall faces rises to about 4.5 g/cm$^2$. This causes a crackling noise to arise due to the frictional force on the film member 26b increasing.

Figure 7:
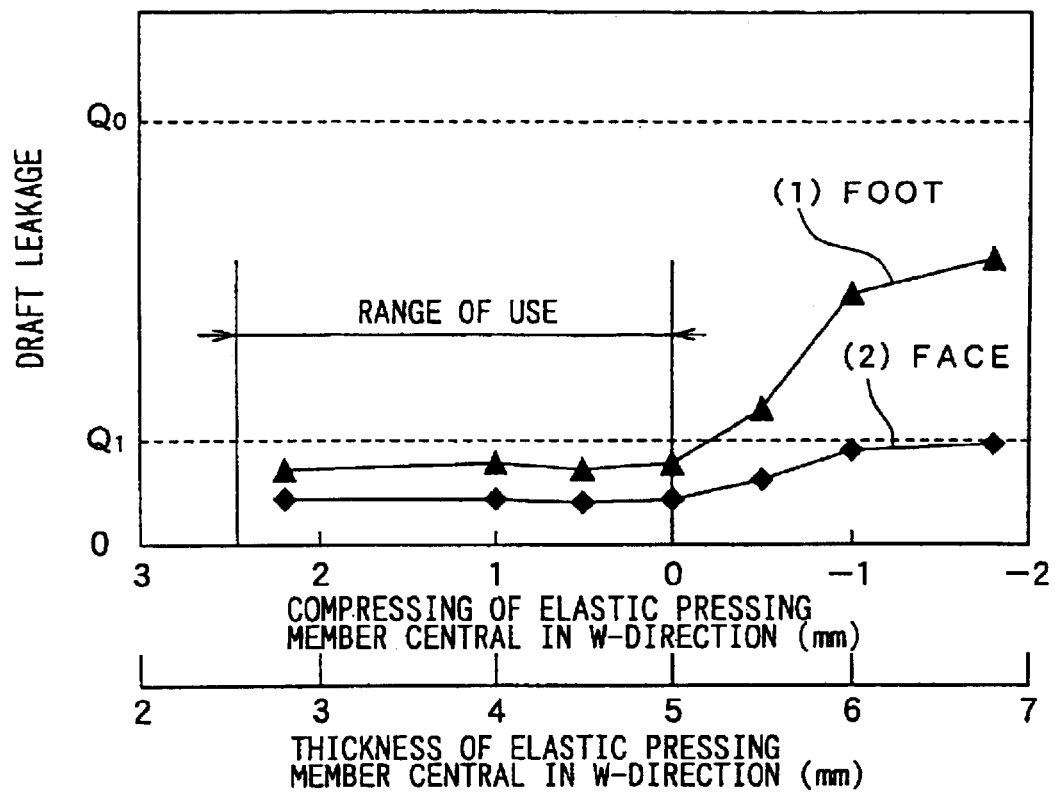
FIG. 7 is a graph showing relationships between amount of compression of an elastic pressing member and the amount of draft leakage in the first preferred embodiment.
Figure 8:
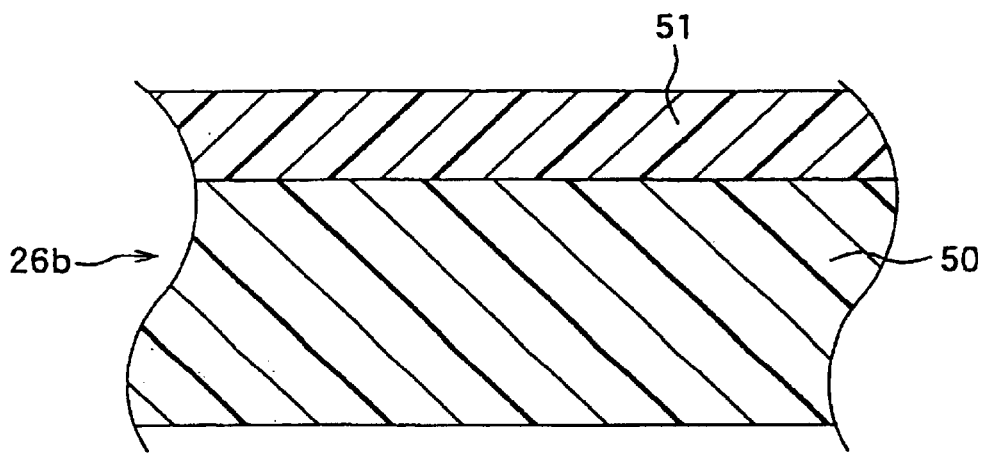
FIG. 8 is a partial sectional view of a film member of a second preferred embodiment.

FIG. 7 is a based on experiments carried out by the present inventors and shows, where three elastic pressing members 26e of free state thickness t=5 mm are used, the relationship between the post-assembly amount of compression of the elastic pressing member 26e positioned centrally in the W-direction and the post-assembly thickness of the same elastic pressing member 26e and the amount of draft leakage. Here, (1) in FIG. 7 shows the amount of draft leakage to the face port 22 side in the FOOT mode and (2) shows the amount of draft leakage to the foot port 23 side in the FACE mode.

As conditions of the experiment, in the FOOT mode the voltage impressed on the fan motor 14a of the blower 13 was made the maximum voltage (12V) and the blower 13 was thereby operated at its maximum speed (Hi). similarly in the FACE mode, the voltage impressed on the fan motor 14a of the blower 13 was made the maximum voltage (13.5V) and the blower 13 was thereby operated at its maximum speed (Hi).

Although in FIG. 3 the opening areas of the face port 22 and the foot port 23 have been shown approximately equal to simplify the drawing, to increase the face outlet flow, the opening area of the face port 22 is made about 30% larger than the opening area of the foot port 23. And because of this, the FOOT mode draft leakage (1) to the face port 22 side is greater than the FACE mode draft leakage (2) to the foot port 23 side.

And, as will be understood from the characteristics shown in FIG. 7, by making the post-assembly amount of compression of the elastic pressing member 26e (positioned centrally in the W-direction) at least 0, the FOOT mode draft leakage (1) is kept small, not greater than the maximum value $Q_1$ of the FACE mode draft leakage (2). From this, it can be seen that limiting the maximum value of the spacing L1 central in the W-direction to a range such that the elastic pressing member amount of compression is at least 0 is also preferable for suppressing draft leakage.

Because the film member 26b can basically perform a sealing function by pressing against the edge seal faces 22b, 23b under a draft pressure, even where the post-assembly amount of compression of the elastic pressing member 26e positioned centrally in the W-direction is on the minus side (where a gap forms between the elastic pressing member 26e and the film member 26b), draft leakage can be kept down to a value amply smaller than a target leakage $Q_0$.

Second Preferred Embodiment

Whereas in the first preferred embodiment a case wherein the film member 26b consists of a simple PET (PolyEthylene Terephthalate) film, in the second preferred embodiment, the film member 26b is made with a two-layer structure consisting of a film base layer 50 and a low-friction material layer 51. That is, a low-friction material layer 51 is provided integrally with the face of the film base layer 50 to slide against the edge seal faces 22b, 23b and the grill members 22a, 23a of the case 120. Here, the film base layer 50 has about the same thickness (188 μm) as the film member 26b of the first preferred embodiment, and as its specific material PET (PolyEthylene Terephthalate), PPS (PolyPhenylene Sulfide) or PEN (PolyEthylene Naphthalate) or the like is suitable.

The thickness of the low-friction material layer 51 is about 1.2 μm, and is made of a resin having a lower coefficient of friction than the film base layer 50 and has a resistance to heat to withstand heat from sliding friction. Specifically, silicon resin and fluorine resin and the like are suitable. With this second preferred embodiment, by providing the low-friction material layer 51 on the sliding side of the film member 26b, it is possible to reduce the frictional forces between the film member 26b and the case inner walls and thereby more effectively prevent the production of crackling noise by the film member 26b.

Third Preferred Embodiment

Figure 9:
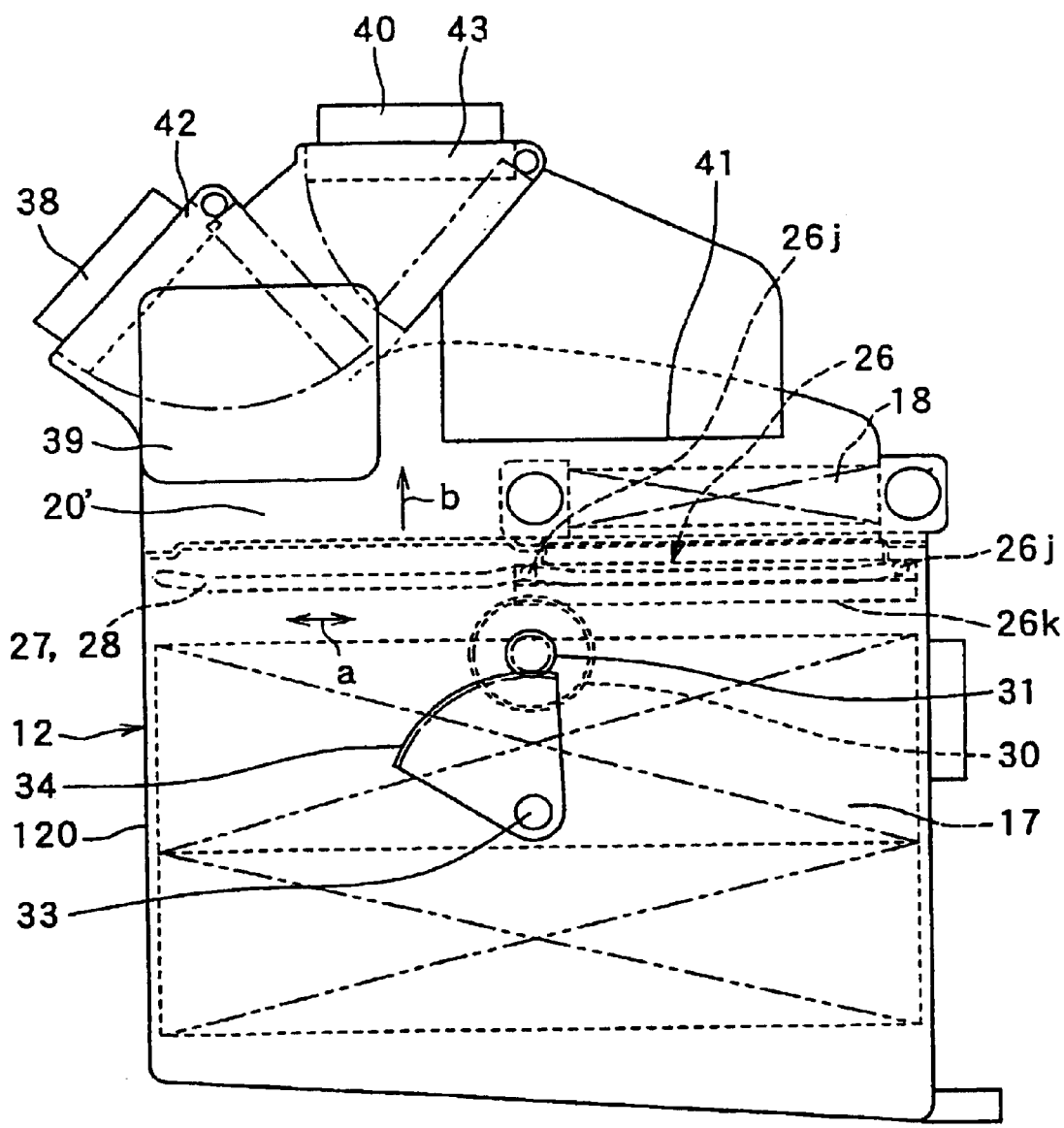
FIG. 9 is a schematic sectional view of a front seat air conditioner for a vehicle according to a third preferred embodiment.

FIG. 9 shows a third preferred embodiment. Here, a front seat air-conditioning unit 12 disposed behind a dashboard at the front of a passenger compartment employs (to control outlet temperature of air delivered to the passenger compartment) an air-mixing method whereby the flow proportions of a warm draft passing through a heater core 18 and a cool draft passing through a cool draft bypass passage 20' bypassing the heater core 18 are adjusted. And as a door for this air-mixing method, a sliding door 26 is used.

The specific construction and drive mechanism of this sliding door 26 is the same as in the first preferred embodiment and therefore will not be described here. In FIG. 9, the reference numeral 38 denotes a center face port; numeral 39 a side face port; numeral 40 a defroster port; numeral 41 a foot port; and numeral 42 a first mode door for opening and closing a passage leading to the center face port 38 and a passage leading to the defroster port 40 and the foot port 41. The reference numeral 43 denotes a second mode door for opening and closing a passage leading to the defroster port 40 and a passage leading to the foot port 41.

Fourth Preferred Embodiment

Figure 6:
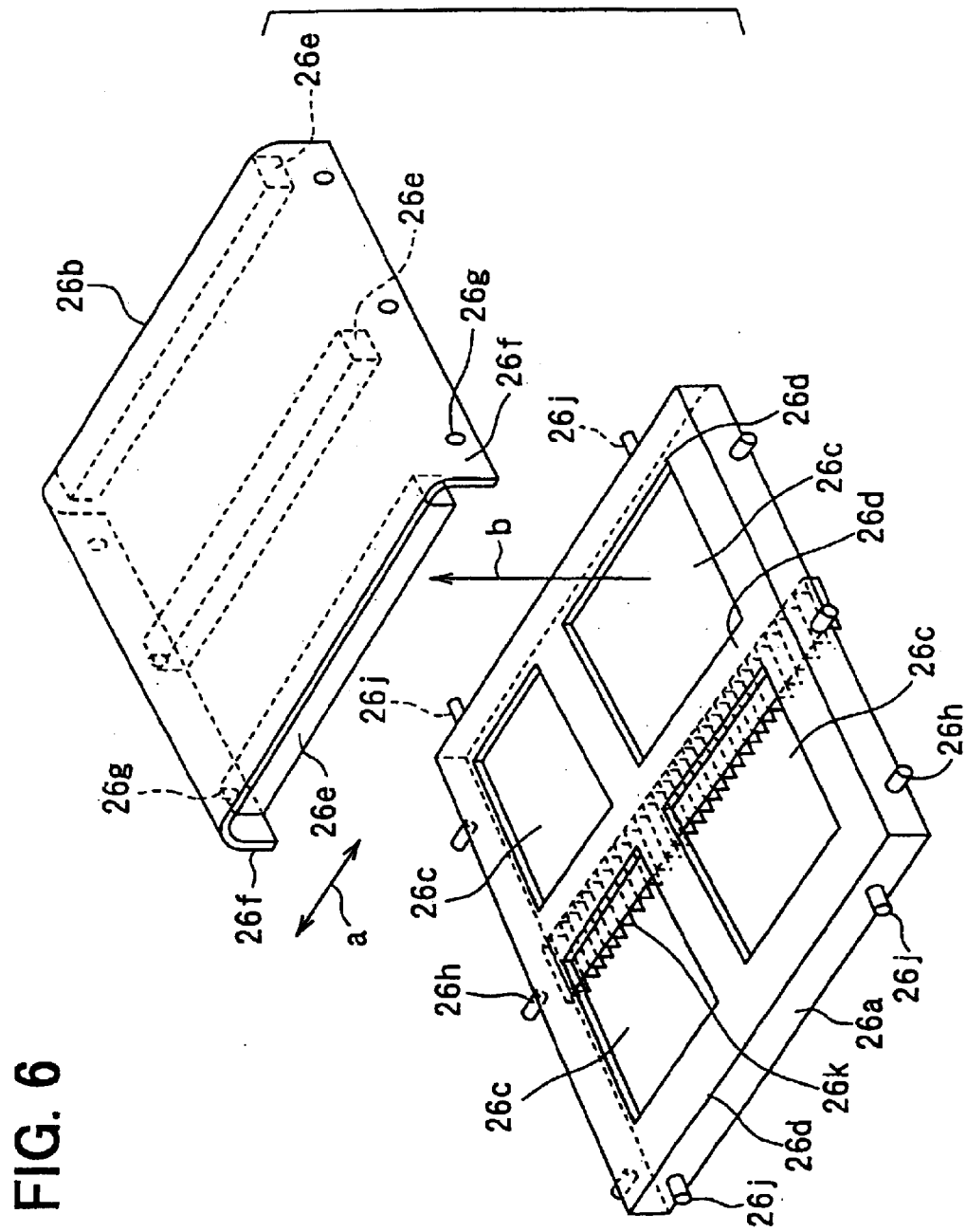
FIG. 6 is an exploded perspective view of a sliding door according to a fourth preferred embodiment of the present invention.

FIG. 6 shows a fourth preferred embodiment. Whereas in the first preferred embodiment slender elastic pressing members 26e of rectangular cross-section were fixed by means such as adhesion to the plate faces 26d of the door plate 26a, in this fourth preferred embodiment these elastic pressing members 26e are fixed not to the door plate 26a but rather to the inner side face of the film member 26b.

When the elastic pressing members 26e are fixed to the film member 26b side, because the rigidity of the elastic pressing members 26e and the rigidity of the adhesive add to the rigidity of the film member 26b itself, the rigidity of the film member 26b as a whole including the elastic pressing members 26e rises. Consequently, even if a concave distortion forms in the film member 26b, inverting of the concave distortion can be prevented by the increased rigidity of the film member 26b. Therefore, extraneous noise (popping noise) caused by inverting of the concave distortion is prevented.

Now, whereas in the first preferred embodiment the production of popping noise was prevented by the spacing L1 central in the W-direction and the spacing L2 at the W-direction ends being set in the relationship L1≧L2, with this fourth preferred embodiment, because the production of extraneous noise (popping noise) can be prevented as described above by increasing the rigidity of the film member 26b and thereby preventing any concave deformity in it from inverting, the spacing setting L1≧L2 is not always necessary. Therefore, with this fourth preferred embodiment, it is not necessary for the molding accuracy of the case 120 to be raised to regulate the spacing L1 and the spacing L2 Therefore, the molding cost of the case 120 can be reduced.

Fifth Preferred Embodiment

Figure 12:
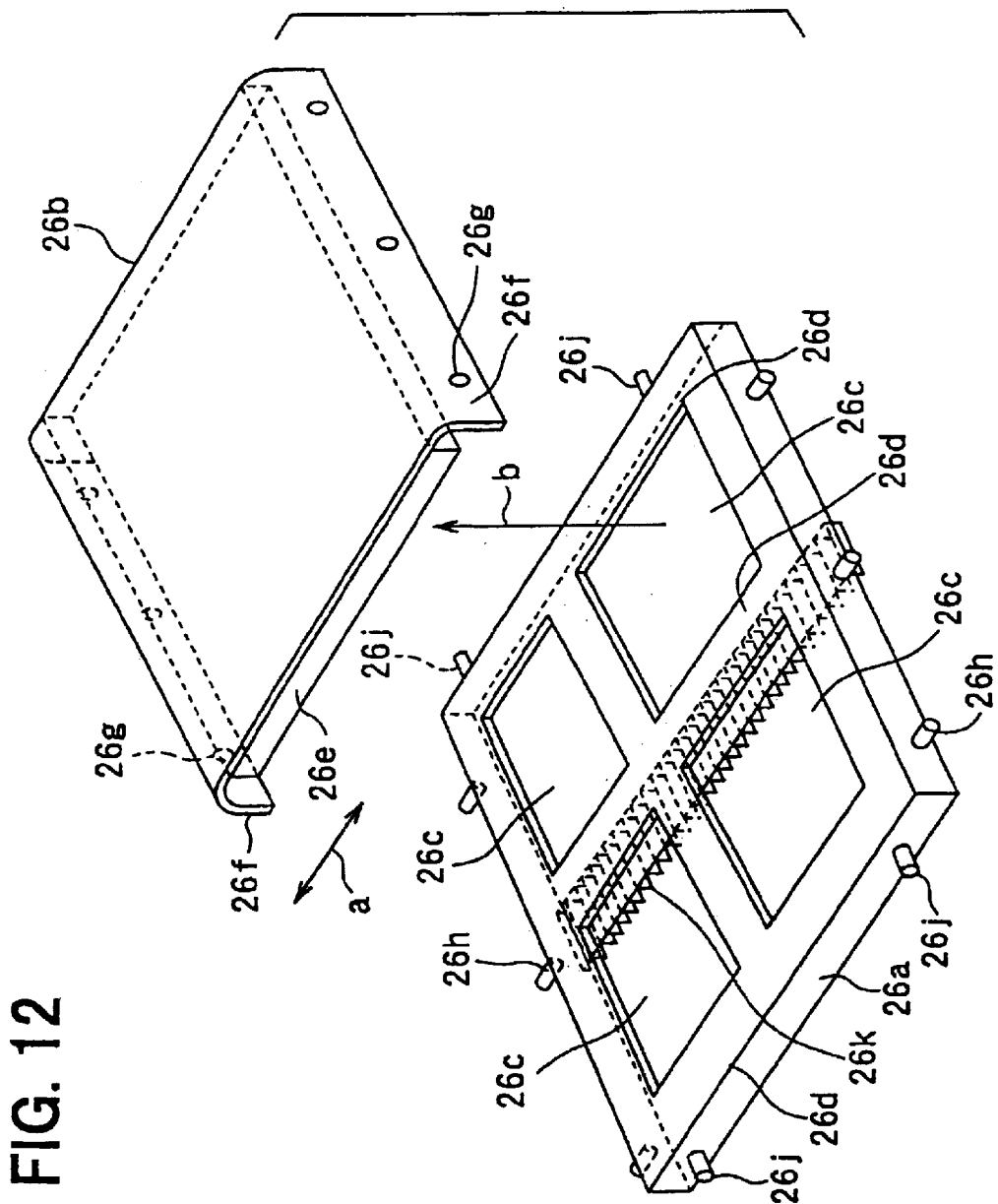
FIG. 12 is an exploded perspective view of a sliding door according to a fifth preferred embodiment.

FIG. 12 shows a fifth preferred embodiment, which is a variation of the fourth preferred embodiment. Here, an elastic pressing member 26e fixed to the film member 26b side is a rectangular shaped plate matching the rectangular shape of the film member 26b. The entire face of the elastic pressing member 26e adhered to the inner side face of the film member 26b. Because an elastic pressing member 26e having a rectangular plate shape is fixed to the film member 26b side over its entire face, the rigidity of the whole film member 26b becomes much higher than in the fourth preferred embodiment. This prevents extraneous noise (popping noise).

Because of this, in this fifth preferred embodiment, the thickness of the elastic pressing member 26e can be made thinner than in the fourth preferred embodiment. For example, in the fourth preferred embodiment the thickness of the elastic pressing member 26e in the free state may be made t=5 mm, and in the fifth preferred embodiment the thickness of the elastic pressing member 26e in the free state may be made t=4 mm.

Now, in the fourth and fifth preferred embodiments, because the rigidity of the film member 26b is increased by fixing the elastic pressing member or members 26e to the inner side face of the film member 26b by adhesion, the sliding friction between the film member 26b and the case 120 increases with increase in rigidity. The crackling noise from the film member 26b caused by the slip-stick phenomenon is more likely to arise.

To avoid this, in the fourth and fifth preferred embodiments described above, the post-assembly elastic compression (amount of compression) of the elastic pressing member or members 26e is regulated to around 0 mm, or specifically the range 0±1.5 mm. That is, by limiting the elastic compression to within +1.5 mm, increasing of the sliding friction between the film member 26b and the case 120 can be limited and the production of crackling noise from the film member 26b can be suppressed.

If the elastic compression is minus, a gap forms as mentioned above between the elastic pressing members 26e and the door plate 26a. If the elastic compression is within −1.5 mm the draft leakage can be kept to a very low level. This will not constitute a problem in practice, as can be seen from FIG. 7.

Other Preferred Embodiments

Whereas in the foregoing first through fourth preferred embodiments, the grill members 22a, 23a are parallel with the door sliding direction a in only one location in the ports 22 and 23, when the opening areas of the ports 22, 23 are large, grill members 22a, 23a may be provided parallel with the door sliding direction a in more than one location. In this case also, the elastic pressing members 26e are preferably disposed only at positions corresponding to the grill members 22a, 23a and the edge seal faces 22b, 23b.

A sliding door according to the present invention can also be applied to an inside/outside air switching door of a vehicle air-conditioning unit, and further can be applied widely to air passage switching devices in applications other than vehicle air-conditioners.

Lastly, the present invention can be used with rotational doors, such as those disclosed and described in U.S. Pat. No. 5,564,979, issued on Oct. 15, 1996, hereby incorporated by reference.

What is claimed is:

1. An air passage switching device for opening and closing at least one air passage, said air passage switching device comprising:

a sliding door that slides in a sliding direction along an edge of an opening of the air passage, the edge of the opening being parallel to the sliding direction of the sliding door, the sliding door further comprising a film member that presses against the edge of the opening and a grill member, the grill member being parallel to the sliding direction at a center of the air passage, the sliding door including a door plate supporting the film member, the door plate having openings that allow a draft pressure to pass therethrough and act on the film member; and elastic pressing means disposed between the film member and the door plate that elastically presses the film member against the edge of the opening and the grill member;

wherein a first spacing between the door plate and the grill member is equal to or greater than a second spacing between the edge of the opening and the door plate.

2. An air passage switching device according to claim 1, wherein a maximum value of the first spacing is set to a range such that an amount of elastic compression of said elastic pressing means after assembly is at least 0.

3. An air passage switching device according to claim 1, wherein the elastic pressing means comprises a plurality of slender elastic pressing means extending parallel with the sliding direction of the sliding door, said plurality of slender elastic pressing means disposed only in positions facing the edge of the air opening and the grill member.

4. An air passage switching device according to claim 1, wherein the film member comprises a film base layer and a low-friction material layer provided on a side of the film base layer to slide over the edge of the opening.

5. An air passage switching device according to claim 1, further comprising an air conditioner having air passages that open and close with the sliding door for supplying air to a passenger compartment of the vehicle.

6. An air passage switching device according to claim 1, wherein the air passage includes a second opening having a second grill member, said second grill members being parallel to the sliding direction of the sliding door and disposed at said center of the air passage.

7. An air passage switching device according to claim 1, wherein said door member supports said film member along a curved periphery, said opening having a curved periphery matching that of said film member.

8. The air passage switching device according to claim 1, wherein a case dividing plane is formed proximate to and along the grill member.

9. An air passage switching device for opening and closing at least one air passage, said air passage switching device comprising:

a sliding door that slides in a sliding direction along one of a plurality of edges of an opening of the air passage, the one of said plurality of edges of the opening being parallel to the sliding direction of the sliding door, the sliding door further comprising a film member that presses against the one of said plurality of edges of the opening and a grill member, the grill member being disposed between two of said plurality of edges and parallel to the sliding direction, the sliding door including a door plate supporting the film member, the door plate having openings that allow a draft pressure to pass therethrough and act on the film member; and elastic pressing means disposed between the film member and the door plate that elastically presses the film member against the one of said plurality of edges of the opening and the grill member;

wherein a first spacing between the door plate and the grill member is equal to or greater than a second spacing between the one of said plurality of edges of the opening and the door plate.

* * * * *